(12) United States Patent
Leone et al.

(10) Patent No.: US 9,599,046 B2
(45) Date of Patent: Mar. 21, 2017

(54) SYSTEMS AND METHODS FOR DEDICATED EGR CYLINDER VALVE CONTROL

(71) Applicant: Ford Global Technologies, LLC, Dearborn, MI (US)

(72) Inventors: Thomas G. Leone, Ypsilanti, MI (US); Michael Howard Shelby, Plymouth, MI (US); Daniel Joseph Styles, Canton, MI (US); James Alfred Hilditch, Canton, MI (US); Brad Alan Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 14/297,232

(22) Filed: Jun. 5, 2014

(65) Prior Publication Data

US 2015/0354482 A1 Dec. 10, 2015

(51) Int. Cl.
*F02D 41/00* (2006.01)
*F02D 13/02* (2006.01)
(Continued)

(52) U.S. Cl.
CPC ..... *F02D 41/0065* (2013.01); *F02D 13/0207* (2013.01); *F02D 13/0261* (2013.01); *F02D 13/0265* (2013.01); *F02D 41/005* (2013.01); *F02D 41/0007* (2013.01); *F02D 41/10* (2013.01); *F02D 41/12* (2013.01); *F02M 26/05* (2016.02); *F02M 26/43* (2016.02); *F02B 2075/125* (2013.01); *F02D 41/008* (2013.01);
(Continued)

(58) Field of Classification Search
CPC ...... D02D 41/12; D02D 1/005; D02D 1/0065; D02D 1/10; D02D 1/0082; D02D 1/008; F02D 13/0207; F02D 13/0265; F02D 13/0257; F02D 13/0203; F02D 13/0261; F02D 13/0276; F02D 2041/001; F02M 26/05; F02M 26/43; F02M 26/07; F02M 25/07; F02M 25/0707; F02M 25/0709; F02M 25/0712; F02M 25/0749
USPC ... 123/90.15, 568.21, 568.11, 568.2, 568.12, 123/559.1, 564; 701/108; 60/605.2, 602
See application file for complete search history.

(56) References Cited

U.S. PATENT DOCUMENTS 4,143,635 A   3/1979   Iizuka et al.
5,279,515 A   1/1994   Moore et al.
(Continued)

FOREIGN PATENT DOCUMENTS

WO   2012108796 A1   8/2012
WO   2014005127 A2   1/2014

OTHER PUBLICATIONS

Hilditch, James A. et al., "Systems and Methods for Exhaust Catalyst Temperature Control," U.S. Appl. No. 14/341,484, Filed Jul. 25, 2014, 42 pages.
(Continued)

*Primary Examiner* — Lindsay Low
*Assistant Examiner* — George Jin
(74) *Attorney, Agent, or Firm* — Julia Voutyras; John D. Russell; B. Anna McCoy (57) ABSTRACT

Systems and methods for improving combustion in a highly exhaust gas diluted engine are disclosed. The methods and systems may be provided in an engine that includes independent control of cylinder valves with respect to other cylinder valves.

18 Claims, 6 Drawing Sheets

(51) Int. Cl.
*F02D 41/12* (2006.01)
*F02D 41/10* (2006.01)
*F02B 75/12* (2006.01)

(52) U.S. Cl.
CPC ....... *F02D 2041/001* (2013.01); *F02M 26/01* (2016.02); *Y02T 10/144* (2013.01); *Y02T 10/18* (2013.01); *Y02T 10/47* (2013.01)

(56) References Cited

U.S. PATENT DOCUMENTS

| | | | |
|---|---|---|---|
| 5,746,189 A | 5/1998 | Kuzuya et al. | |
| 5,937,807 A | 8/1999 | Peters et al. | |
| 6,053,154 A | 4/2000 | Pott | |
| 6,138,650 A | 10/2000 | Bailey | |
| 6,230,695 B1 | 5/2001 | Coleman et al. | |
| 6,293,246 B1 | 9/2001 | Tanahashi et al. | |
| 6,394,051 B1 | 5/2002 | Filipe et al. | |
| 6,397,790 B1 | 6/2002 | Collier, Jr. | |
| 6,405,720 B1 | 6/2002 | Collier, Jr. | |
| 6,499,449 B2 | 12/2002 | Michelini et al. | |
| 6,543,230 B1 * | 4/2003 | Schmid | F02D 41/0065 123/568.11 |
| 6,655,324 B2 | 12/2003 | Cohn et al. | |
| 6,718,755 B2 | 4/2004 | Brehob | |
| 6,820,415 B2 | 11/2004 | Abet et al. | |
| 6,826,905 B2 | 12/2004 | Gui et al. | |
| 6,877,492 B1 * | 4/2005 | Osterwald | F02B 29/0437 123/568.11 |
| 6,918,384 B2 | 7/2005 | Jehlik et al. | |
| 6,925,802 B2 | 8/2005 | Arnold | |
| 6,968,825 B2 | 11/2005 | Hitomi et al. | |
| 7,086,221 B2 | 8/2006 | Pott et al. | |
| 7,290,504 B2 | 11/2007 | Lange | |
| 7,779,812 B2 | 8/2010 | Leone et al. | |
| 7,942,127 B2 | 5/2011 | Leone et al. | |
| 8,041,500 B2 | 10/2011 | Leone | |
| 8,100,116 B2 | 1/2012 | He et al. | |
| 8,108,125 B2 | 1/2012 | Leone | |
| 8,150,605 B2 | 4/2012 | Doering et al. | |
| 8,230,843 B2 | 7/2012 | Kurtz | |
| 8,239,122 B2 | 8/2012 | Leone et al. | |
| 8,240,294 B2 | 8/2012 | Surnilla et al. | |
| 8,291,891 B2 | 10/2012 | Alger, II et al. | |
| 8,352,160 B2 | 1/2013 | Leone | |
| 8,352,164 B2 | 1/2013 | Leone et al. | |
| 8,511,084 B2 | 8/2013 | Ulrey et al. | |
| 8,528,511 B2 | 9/2013 | Price et al. | |
| 8,539,768 B2 | 9/2013 | Hayman et al. | |
| 8,561,599 B2 | 10/2013 | Gingrich et al. | |
| 8,701,409 B2 | 4/2014 | Pursifull et al. | |
| 8,763,570 B2 | 7/2014 | Hayman et al. | |
| 9,297,320 B2 * | 3/2016 | Hilditch | F02M 26/16 |
| 2009/0308070 A1 | 12/2009 | Alger, II et al. | |
| 2011/0041495 A1 | 2/2011 | Yager | |
| 2011/0253113 A1 | 10/2011 | Roth et al. | |
| 2012/0023937 A1 | 2/2012 | Styles et al. | |
| 2012/0078492 A1 | 3/2012 | Freund et al. | |
| 2012/0204844 A1 | 8/2012 | Gingrich et al. | |
| 2012/0204845 A1 * | 8/2012 | Gingrich | F02M 26/43 123/568.17 |
| 2012/0260894 A1 | 10/2012 | Hayman | |
| 2012/0260897 A1 | 10/2012 | Hayman et al. | |
| 2012/0285163 A1 | 11/2012 | Hayman et al. | |
| 2012/0285426 A1 | 11/2012 | Hayman et al. | |
| 2012/0285427 A1 | 11/2012 | Hayman et al. | |
| 2012/0323470 A1 | 12/2012 | Klingbeil et al. | |
| 2013/0030672 A1 * | 1/2013 | Klingbeil | F02D 41/0085 701/109 |
| 2013/0061575 A1 * | 3/2013 | Korenaga | F02D 41/0065 60/278 |
| 2013/0186376 A1 * | 7/2013 | Peters | F02D 41/0065 123/568.2 |
| 2013/0220286 A1 * | 8/2013 | Gingrich | F02D 41/0065 123/568.11 |
| 2013/0276730 A1 | 10/2013 | Borean et al. | |
| 2014/0041384 A1 * | 2/2014 | Mischler | F02D 41/0007 60/605.2 |
| 2014/0142833 A1 * | 5/2014 | Gingrich | F02D 41/0255 701/103 |
| 2014/0196703 A1 * | 7/2014 | Boyer | F02D 41/0055 123/568.21 |
| 2014/0202433 A1 * | 7/2014 | Dane | F02D 41/0065 123/568.11 |
| 2015/0047347 A1 * | 2/2015 | Ulrey | F02M 26/07 60/605.2 |
| 2015/0114341 A1 * | 4/2015 | Geckler | F02D 41/0065 123/295 |
| 2015/0361927 A1 * | 12/2015 | Glugla | F02M 25/0749 60/603 |
| 2015/0369180 A1 * | 12/2015 | Leone | F02N 11/0803 123/52.1 |
| 2016/0040607 A1 * | 2/2016 | Ku | F02D 41/0065 123/568.17 |

OTHER PUBLICATIONS

Hilditch, James A. et al., "Systems and Methods for Dedicated EGR Cylinder Exhaust Gas Temperature Control," U.S. Appl. No. 14/334,329, Filed Jul. 17, 2014, 34 pages.

Potteau, Sebastian et al., "Cooled EGR for a Turbo SI Engine to Reduce Knocking and Fuel Consumption," SAE Technical Paper Series No. 2007-01-3978, Powertrain & Fluid Systems Conference and Exhibition, Rosemont, Ill., Oct. 29-Nov. 1, 2007, 13 pages.

Alger, Terry et al., "Dedicated EGR: A New Concept in High Efficiency Engines," SAE Technical Paper Series No. 2009-01-0694, Southwest Research Institute, 12 pages.

Ulrey, Joseph N. et al., "Dedicated EGR Cylinder Post Combustion Injection," U.S. Appl. No. 13/915,445, Filed Jun. 11, 2013, 34 pages.

Martin, Douglas R. et al., "Method and System for EGR Control," U.S. Appl. No. 14/327,379, Filed Jul. 9, 2014, 48 pages.

Leone, Thomas G. et al., "Systems and Methods for EGR Control," U.S. Appl. No. 14/298,733, Filed Jun. 6, 2014, 45 pages.

Leone, Thomas G. et al., "Systems and Methods for Improving Operation of a Highly Dilute Engine," U.S. Appl. No. 14/271,248, Filed May 6, 2014, 40 pages.

Glugla, Chris P., "Systems and Methods for Boost Control," U.S. Appl. No. 14/307,165, Filed Jun. 17, 2014, 56 pages.

* cited by examiner

SYSTEMS AND METHODS FOR DEDICATED EGR CYLINDER VALVE CONTROL

FIELD

The present description relates to systems and methods for improving operation of an engine that operates with high levels of exhaust gas recirculation (EGR). The methods may be particularly useful for engines that include a sole cylinder that provides external EGR to other engine cylinders.

BACKGROUND AND SUMMARY

An engine may be operated with one or more dedicated EGR cylinders (e.g., a cylinder that directs at least a portion of its exhaust flow, without exhaust from other cylinders, to provide external EGR to engine cylinders) that direct all of their exhaust gas to the intake air of other engine cylinders as external exhaust gas recirculation (EGR). Such an arrangement may allow the engine to operate with higher levels of exhaust gas dilution. Consequently, engine pumping work may be reduced and engine efficiency may be improved. However, an engine that includes such a passage may not respond as desired to requests for increased engine torque output because charge dilution may limit or reduce engine torque.

The inventors herein have recognized the above-mentioned disadvantages of operating a highly diluted engine and have developed an engine operating method, comprising: reducing exhaust flow of one or more dedicated EGR cylinders providing external exhaust gas recirculation to cylinders of an engine in response to an increase in driver demand torque.

By reducing exhaust flow of dedicated EGR cylinders providing external exhaust gas recirculation to remaining engine cylinders, it may be possible to improve an engine's torque response. Specifically, torque production of engine cylinders supplied exhaust gas from the dedicated EGR (DEGR) cylinder(s) may be improved since cylinder volume for additional fresh charge (e.g., air and fuel) may be made available if exhaust gas recirculation is limited during an increase in driver demand torque. Additionally, if the engine is turbocharged, turbocharger lag may be reduced since exhaust energy from the remaining cylinders may be increased during the increase in driver demand torque.

The present description may provide several advantages. For example, the approach may reduce turbocharger lag. Further, the approach may improve engine torque response. Further still, the approach may allow an engine to operate more efficiently after a threshold amount of boost has been achieved, thereby increasing engine efficiency after additional boost may be provided to the engine more readily.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
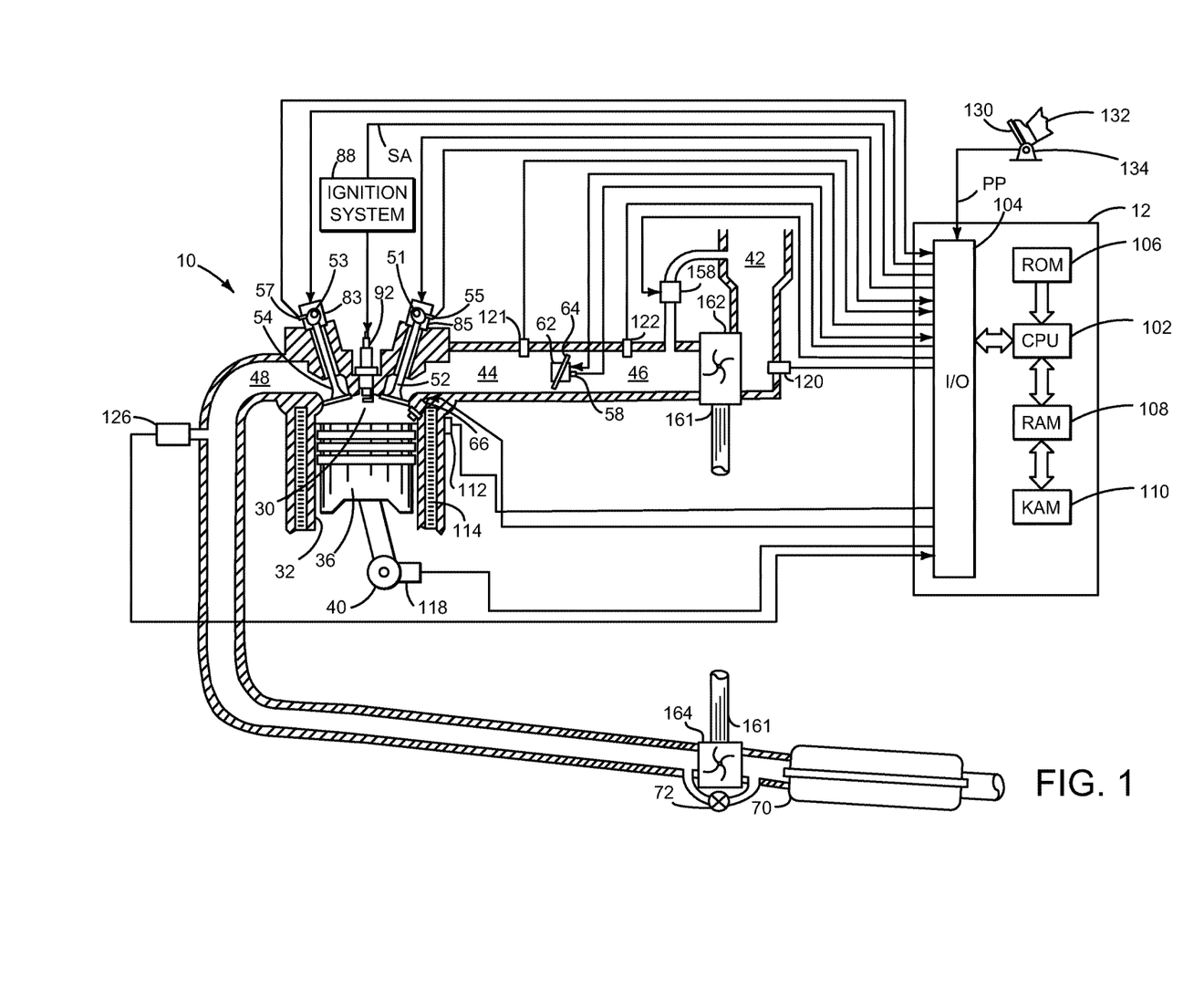
FIG. 1 is a schematic diagram of an engine.
Figure 2:
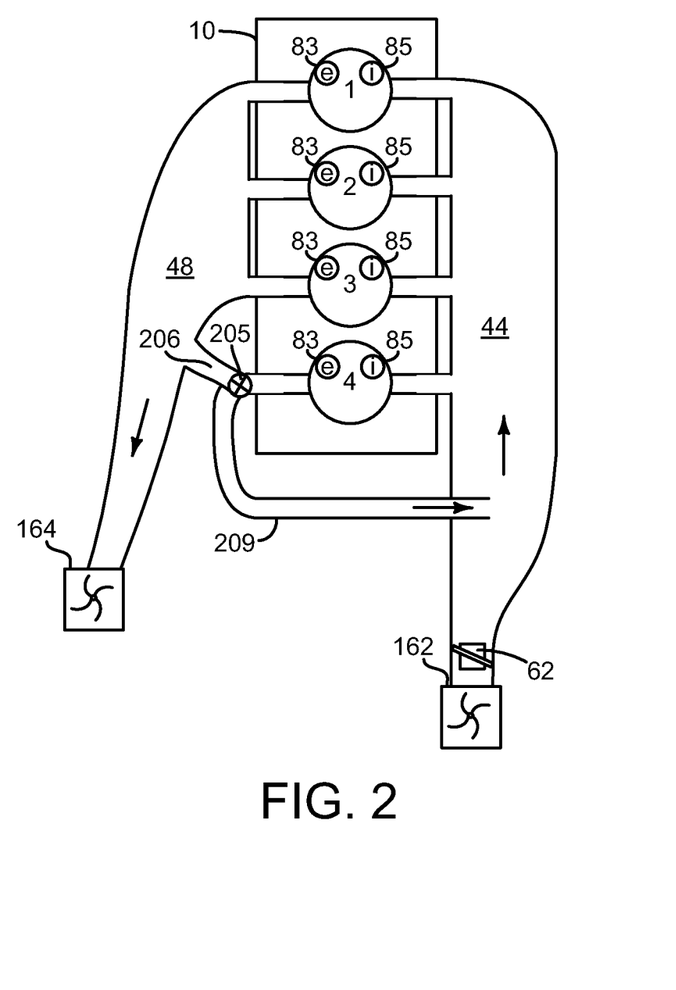
FIGS. 2-3 show example variations of the engine that may exhibit improved combustion stability at higher EGR flow rates.
Figure 3:
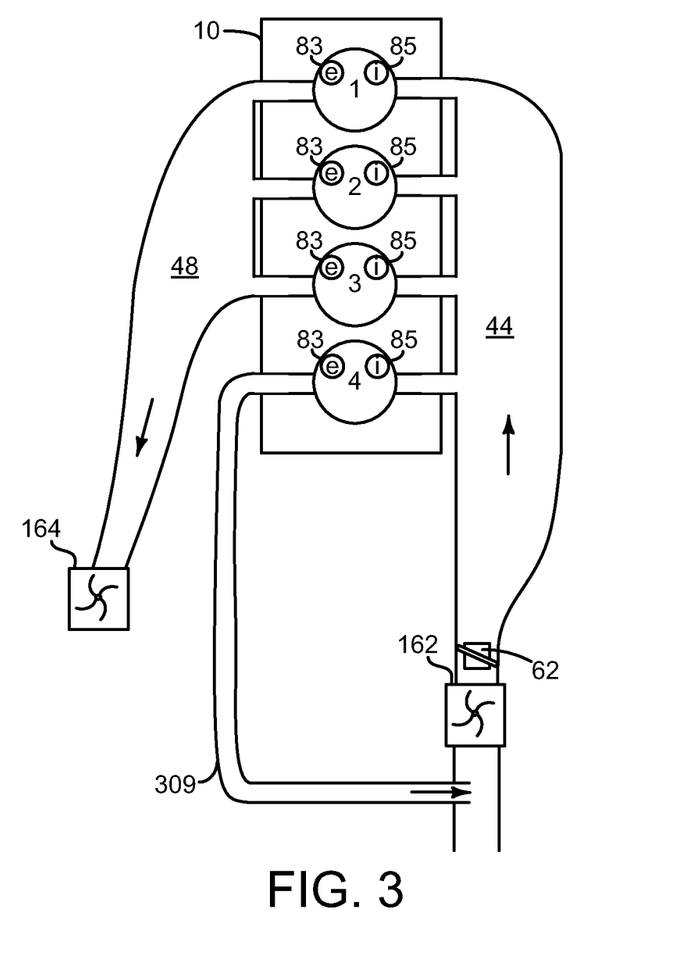
Figure 4:
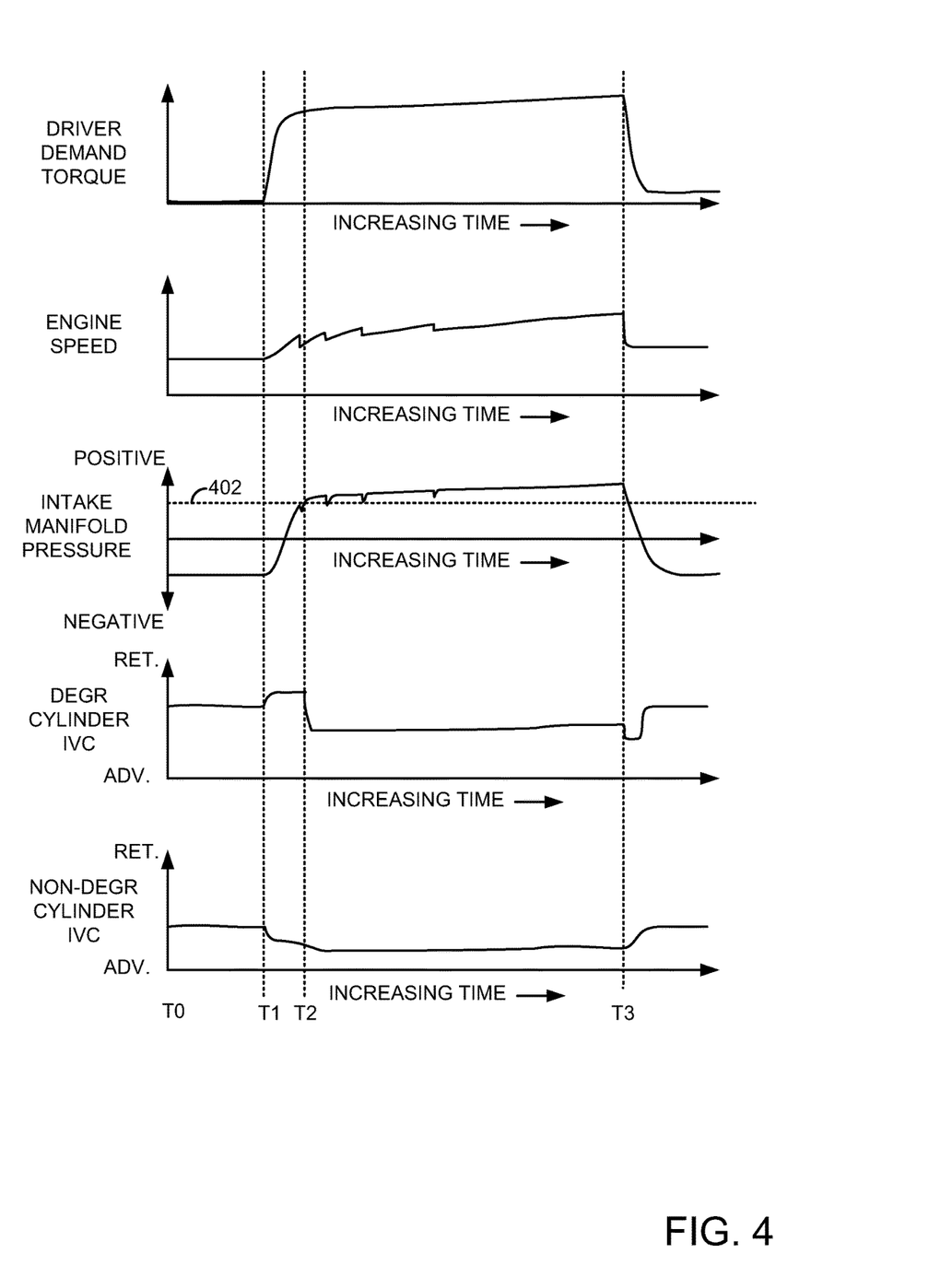
FIG. 4 is an example engine operating sequence according to the method of FIGS. 5 and 6.

The present description is related to operating an engine with highly diluted cylinder mixtures. The engine cylinder mixtures may be diluted using recirculated exhaust gases that are byproducts of combusting air-fuel mixtures. The recirculated exhaust gases may be referred to as EGR. FIGS. 1-3 show example engine configurations that may be operated at higher cylinder charge dilution levels to improve engine efficiency. The engine may operate as shown in the sequence of FIG. 4 according to the method shown in FIGS. 5 and 6.

Referring to FIG. 1, internal combustion engine 10, comprising a plurality of cylinders as shown in FIGS. 2 and 3, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated independently with respect to valves of other cylinders via intake cam 51 and an exhaust cam 53. Intake valve adjuster 85 advances or retards the phase of intake valve 52 relative to a position of crankshaft 40. Additionally, intake valve adjuster 85 may increase or decrease an intake valve lift amount. Exhaust valve adjuster 83 advances or retards the phase of exhaust valve 54 relative to a position of crankshaft 40. Further, exhaust valve adjuster 83 may increase or decrease an exhaust valve lift amount.

The position of intake cam 51 may be determined by intake cam sensor 55. The position of exhaust cam 53 may be determined by exhaust cam sensor 57. In cases where combustion chamber 30 is part of a DEGR cylinder, the timing and/or lift amount of valves 52 and 54 may be adjusted independently of valves in other engine cylinders so that the cylinder air charge of the DEGR cylinder may be increased or decreased relative to cylinder air charge of other engine cylinders during a same engine cycle. In this way, external EGR supplied to engine cylinders may exceed twenty five percent of the cylinder charge mass for a four cylinder engine including a sole DEGR cylinder. Further, the internal EGR amount of cylinders other than the EGR cylinder may be adjusted independently of the DEGR cylinder by adjusting valve timing of those respective cylinders.

Fuel injector 66 is shown positioned to inject fuel directly into cylinder 30, which is known to those skilled in the art as direct injection. Alternatively, fuel may be injected to an intake port, which is known to those skilled in the art as port injection. Intake manifold 44 is shown communicating with optional electronic throttle 62 which adjusts a position of throttle plate 64 to control air flow from boost chamber 46 to intake manifold 44. In some examples, throttle 62 and throttle plate 64 may be positioned between intake valve 52 and intake manifold 44 such that throttle 62 is a port throttle.

Compressor 162 supplies air from air intake 42 to boost chamber 46. Compressor 162 is driven by shaft 161 which is mechanically coupled to turbine 164. Compressor bypass valve 158 may be selectively operated to reduce boost pressure. Waste gate 72 may be selectively opened and closed to control the speed of turbine 164.

Driver demand torque may be determined from a position of accelerator pedal 130 as sensed by accelerator pedal sensor 134. A voltage or current indicative of driver demand torque is output from accelerator pedal sensor 134 when driver's foot 132 operates accelerator pedal 130.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164 and catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 121 coupled to intake manifold 44; a measurement of boost pressure from pressure sensor 122; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative intake and exhaust valve opening overlap, late intake valve closing, or various other examples.

FIG. 2 shows a schematic of a first example of engine 10 showing cylinders 1-4, one of which includes combustion chamber 30 of FIG. 1. The example engine configuration of FIG. 2 may include the devices shown in FIG. 1 for each engine cylinder. The intake valves 52 and exhaust valves 54 of each cylinder may be opened and closed independently of valves of other engine cylinders via intake valve adjuster 85 and exhaust valve adjuster 83. For example, intake 52 and exhaust 54 valves of cylinder number four may be opened and closed at different timings relative to engine crankshaft 40 and other engine cylinder valves. Thus, intake valve 52 of cylinder number four may be closed twenty five engine rotation degrees after BDC intake stroke of cylinder number four. On the other hand, during the same engine cycle, the intake valve of cylinder number one may close five degrees after BDC intake stroke of cylinder number one. Further, the engine configuration of FIG. 2 may be operated according to the method of FIGS. 5 and 6.

Throttle 62 regulates air flow into intake manifold 44, and intake manifold 44 supplies air to each of cylinders 1-4. Intake valves 52 and exhaust valves 54 of one cylinder in the group of cylinders 1-4 may be operated at different timings with respect to valve timing of other cylinders in the group of cylinders 1-4. In one example, valves of cylinders 1-3 operate at a same timing, but valves of cylinder 4 operate at a different timing and/or same timing as valves for cylinders 1-3. For example, the intake valves of a cylinder in the group of cylinders 1-3 may close at 10 crankshaft degrees after bottom dead center intake stroke of the cylinder where the intake valve is closing for a particular engine cycle. On the other hand, the intake valves of cylinder 4 may close at 20 crankshaft degrees after bottom dead center intake stroke of cylinder 4 for the same engine cycle. Exhaust from cylinders 1-3 is directed to exhaust manifold 48 before being processed by a catalyst. Exhaust from cylinder 4 is routed to intake manifold 44 via DEGR cylinder bypass valve 205 and passage 209, or alternatively, to exhaust manifold 48 via DEGR cylinder bypass valve 205 and passage 206. In some examples, DEGR cylinder bypass valve 205 and passage 206 may be omitted.

Each of cylinders 1-4 may include internal EGR via trapping exhaust gases from a combustion event in the respective cylinder and allowing the exhaust gases to remain in the respective cylinder during a subsequent combustion event. The amount of internal EGR may be varied via adjusting intake and exhaust valve opening and/or closing times, for example by adjusting the amount of valve overlap. By increasing intake and exhaust valve opening overlap, additional EGR may be retained in the cylinder during a subsequent combustion event. External EGR is provided to cylinders 1-4 solely via cylinder 4 exhaust and passage 209. External EGR is not provided by exhaust flow from cylinders 1-3. Thus, in this example, cylinder 4 is the sole source of external EGR for engine 10. However, in V configuration engines a cylinder on each cylinder bank may be a dedicated EGR cylinder. Passage 209 enters intake manifold 44 downstream of compressor 162. Exhaust gases from cylinders 1-3 rotate turbine 164, and exhaust gases from cylinder 4 may selectively rotate turbine 164 depending on an operating state of DEGR cylinder bypass valve 205.

Referring now to FIG. 3, a schematic of a second example of engine 10 showing cylinders 1-4 is shown. One of cylinders 1-4 includes combustion chamber 30 of FIG. 1, and the remaining cylinders may include similar devices. The example engine configuration of FIG. 3 may include the devices shown in FIG. 1 for each engine cylinder. The engine configuration shown in FIG. 3 may be supplied fuel via one of the fuel systems shown in FIGS. 5 and 6. Further, the engine configuration of FIG. 3 may be operated according to the method of FIGS. 7 and 8.

FIG. 3 includes many of the same devices and components described in FIG. 2. Therefore, for the sake of brevity, the description of like devices and components is omitted. However, the devices and components operate and perform as described in FIG. 2.

In the example of FIG. 3, engine 10 includes passage 309 which does not communicate with exhaust manifold 48 and enters the engine upstream of compressor 162. EGR flow through passage 309 is adjusted via varying timing of intake valve 85 and exhaust valve 83 of cylinder 4. For example, EGR flow from cylinder 4 to cylinders 1-4 may be reduced via retarding intake valve closing (IVC) from BDC intake stroke cylinder 4. EGR flow from cylinder 4 to cylinders 1-4 may be increased via advancing IVC toward BDC intake stroke cylinder 4. Further, EGR flow from cylinder 4 to cylinders 1-4 may be reduced via retarding exhaust valve closing (EVC) from TDC exhaust stroke. EGR flow from cylinder 4 to cylinders 1-4 may be increased via advancing exhaust valve closing (EVC) toward TDC exhaust stroke.

Passage 309 may improve the possibility of increasing blow through (e.g., where contents of the intake manifold, such as air, is pushed through the cylinder while intake and exhaust valves of the cylinder are simultaneously open during a cylinder cycle) for cylinder 4 when intake manifold pressure is higher than pressure upstream of compressor 162. Rather than being routed downstream of compressor 162, passage 309 is routed upstream of compressor 162 where it may be exposed to pressure that is lower than intake manifold pressure. EGR that flows through passage 309 enters intake manifold 44 after it is compressed via compressor 162.

Thus, the system of FIGS. 1-3 provides for a vehicle system, comprising: an engine; a first variable valve adjustment device coupled to the engine and operating valves of a first cylinder; a second variable valve adjustment device coupled to the engine and operating valves of a second cylinder; a passage fluidly coupling the exhaust side of the first cylinder to an air intake of the engine, the passage not fluidly coupling the exhaust side of other engine cylinders to the air intake; and a controller including non-transitory instructions for increasing blow through of the first cylinder in response to an accelerator tip-out. The vehicle system further comprises additional instructions for decreasing volumetric efficiency of the first cylinder in response to an accelerator tip-in from an engine idle condition.

In some examples, the vehicle system further comprises additional instructions for decreasing volumetric efficiency of the first cylinder during a tip-in. The vehicle system further comprises instructions for increasing volumetric efficiency of the first cylinder during the tip-in in response to a boost pressure. The vehicle system further comprises additional instructions for operating valves of the first cylinder at a different timing than valves of the second cylinder during an engine cycle. The vehicle system further comprises a bypass valve for the first cylinder and further instructions for opening the bypass valve in response to a tip-in.

Figure 5:
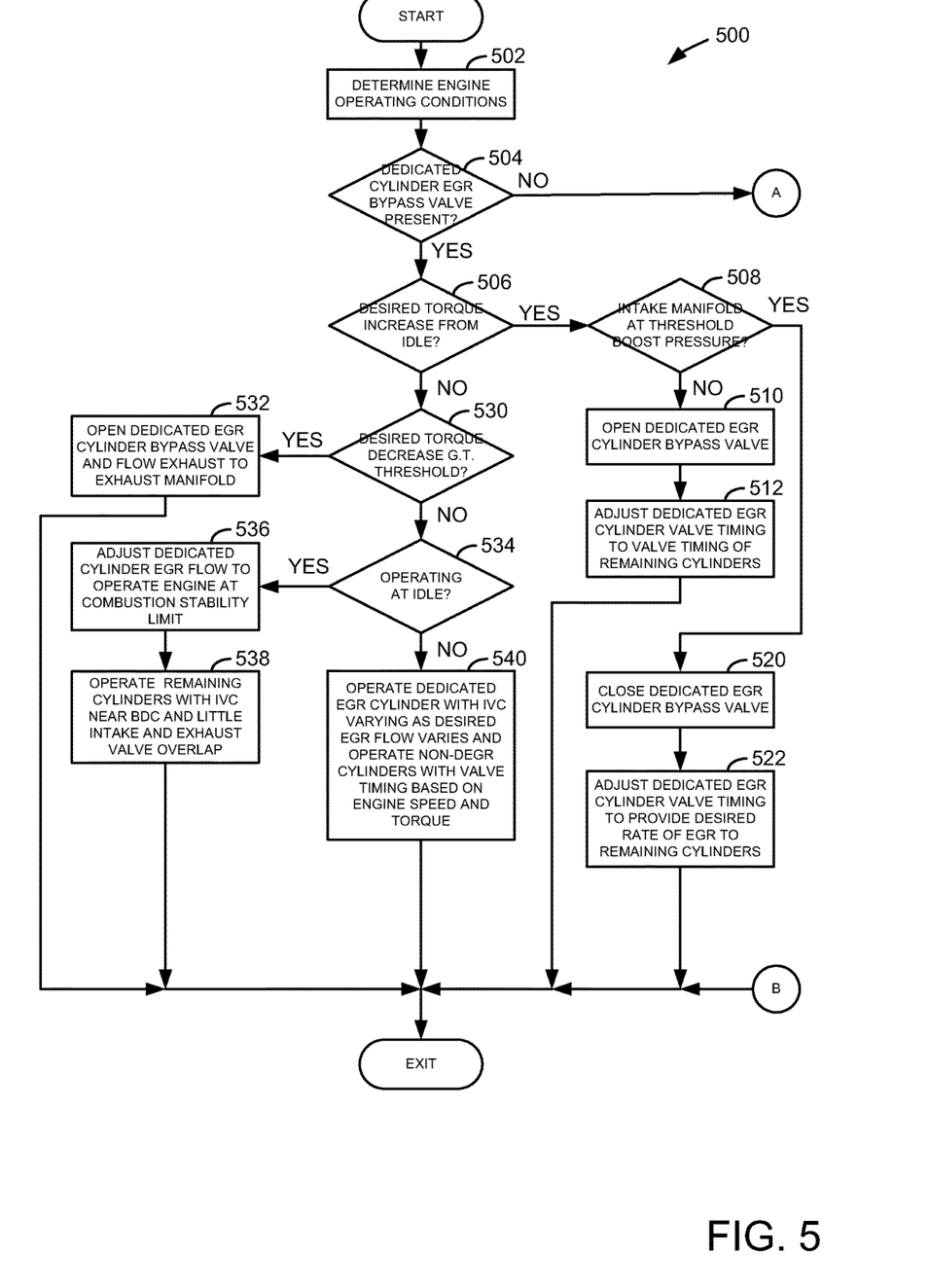
FIGS. 5 and 6 show an example method for operating an engine that includes a DEGR cylinder.
Figure 6:
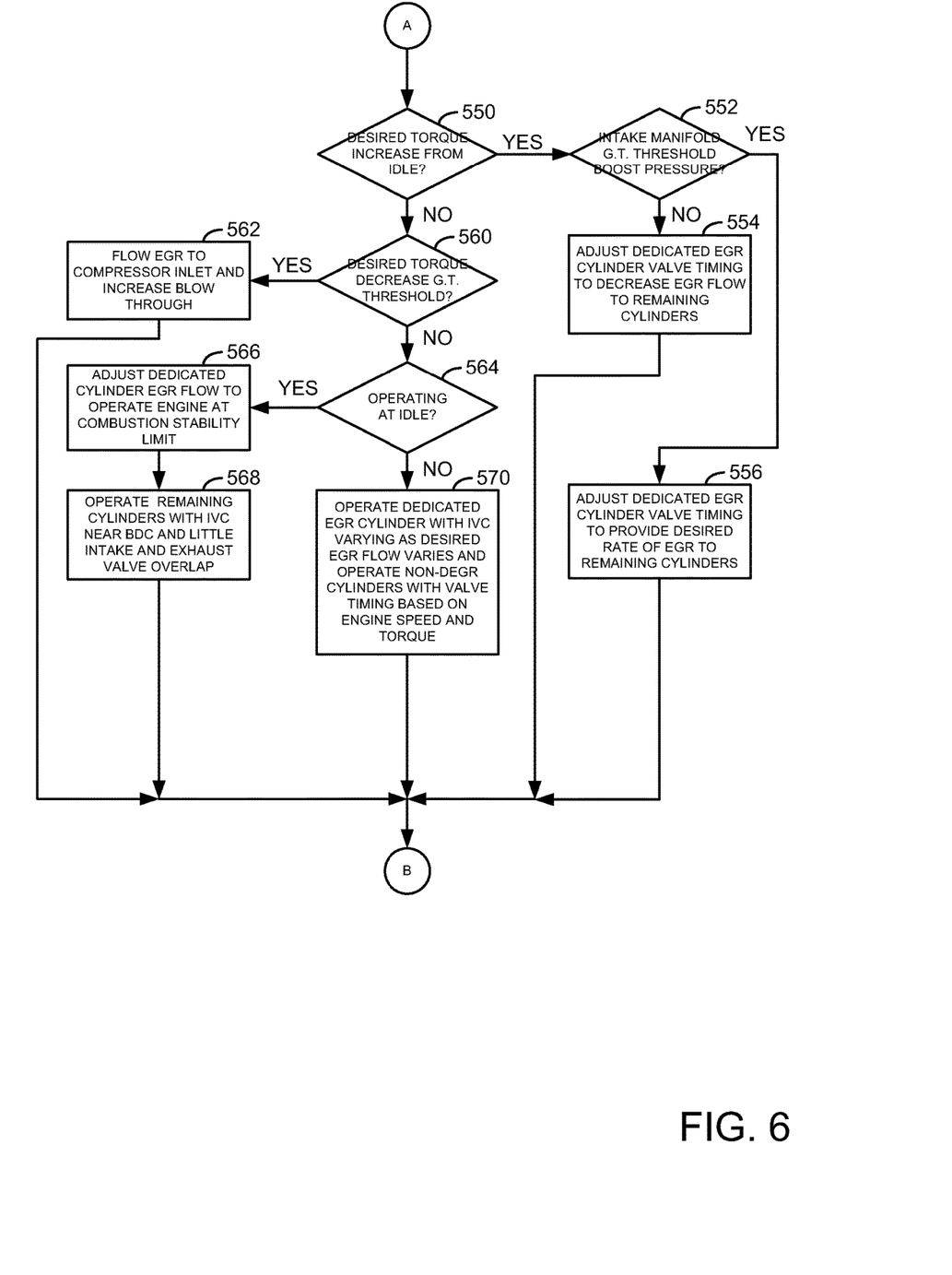

Referring now to FIG. 4, an example engine operating sequence according to the method of FIGS. 5 and 6 and the system of FIGS. 1-3 is shown. The sequence of FIG. 4 is merely one example simulated sequence of the method of FIGS. 5 and 6. For example, while FIG. 4 adjusts IVC during tip-ins and tip-outs, intake valve lift may be increased or decreased to provide similar functionality. In the example sequence of FIG. 4, the engine is configured as shown in FIG. 3.

The first plot from the top of FIG. 4 is a plot of driver demand torque versus time. The Y axis represents driver demand torque and driver demand torque increases in the direction of the Y axis arrow. The X axis represents time and time increases from the left side of FIG. 4 to the right side of FIG. 4. Driver demand torque may be determined from accelerator pedal position.

The second plot from the top of FIG. 4 is a plot of engine speed versus time. The Y axis represents engine speed and engine speed increases in the direction of the Y axis arrow. The X axis represents time and time increases from the left side of FIG. 4 to the right side of FIG. 4.

The third plot from the top of FIG. 4 is a plot of engine intake manifold pressure versus time. The Y axis represents engine intake manifold pressure and engine intake manifold pressure is positive above the X axis and negative below the X axis. Positive intake manifold pressure increases in the direction of the Y axis arrow above the X axis. Negative intake manifold pressure is lower in the direction of the Y axis arrow below the X axis. The X axis represents time and time increases from the left side of FIG. 4 to the right side of FIG. 4. Horizontal line 402 represents a threshold intake manifold pressure corresponding to a threshold boost pressure.

The fourth plot from the top of FIG. 4 is a plot of IVC for the DEGR cylinder versus time. The Y axis represents IVC between TDC compression stroke and BDC compression stroke. IVC is retarded toward TDC compression stroke as the trace moves in the direction of the abbreviation RET. IVC is advanced toward BDC compression stroke as the trace moves in the direction of the abbreviation ADV. The X axis represents time and time increases from the left side of FIG. 4 to the right side of FIG. 4.

The fifth plot from the top of FIG. 4 is a plot of IVC for the non-dedicated EGR cylinders (e.g., other engine cylinders) versus time. The Y axis represents IVC between TDC compression stroke and BDC compression stroke. IVC is retarded toward TDC compression stroke as the trace moves in the direction of the abbreviation RET. IVC is advanced toward BDC compression stroke as the trace moves in the direction of the abbreviation ADV. The X axis represents time and time increases from the left side of FIG. 4 to the right side of FIG. 4.

At time T0, the driver demand torque is low (e.g, at or near zero) and the engine speed is low indicative of operating at idle. Intake manifold pressure is also low since the driver demand torque is low. The DEGR cylinder (e.g., cylinder 4 of FIG. 3) IVC timing is slightly retarded so that external EGR supplied to the engine cylinders via the DEGR cylinder is at a lower level. The lower EGR level may be an EGR flow based on an engine combustion stability limit that specifies a combustion stability standard deviation of indicated mean effective cylinder pressure (IMEP) of less than 5% from a mean value. The IVC timing of cylinders other than the DEGR cylinder (e.g., non-dedicated EGR (DEGR) cylinders, such as cylinders 1-3 of FIG. 3) is more advanced than the IVC timing of the DEGR cylinder.

At time T1, the driver demand torque increases (e.g., a tip-in of the accelerator pedal) in response to an increase in the accelerator pedal position input by a driver. Engine speed begins to increase in response to the increase in driver demand torque and the intake manifold pressure begins to increase as the intake manifold fills to atmospheric pressure, and continues to increase as the turbocharger turbine accelerates the compressor. IVC of the DEGR cylinder is retarded further to reduce flow of EGR into engine cylinders. By reducing EGR flow into engine cylinders other than the DEGR cylinder, it may be possible to reduce turbocharger lag via increasing cylinder air charge during the tip-in event. IVC of non-dedicated EGR cylinders is advanced to further increase the amount of air inducted into non-dedicated EGR cylinders. The additional air charge may help to accelerate the turbine and compressor.

At time T2, the intake manifold pressure reaches a threshold boost pressure 402. The driver demand torque has leveled off and only slowly increases. Engine speed has increased and is at an elevated level. The DEGR cylinder's IVC is advanced in response to boost reaching a threshold level. The DEGR cylinder's IVC is advanced to increase EGR flow to engine cylinders so as to improve engine efficiency at conditions where turbine speed has reached a desired level where generating boost is almost instantaneous. The non-DEGR cylinder IVC is advanced a small amount and begins to stay toward a more advanced state.

Between time T2 and time T3, the driver demand torque increases only slightly while engine speed increases and the vehicle shifts through transmission gears. The intake manifold pressure remains at an elevated level and the IVC timings of the DEGR cylinder and the non-dedicated EGR cylinders remains nearly constant.

At time T3, the driver releases the accelerator pedal (e.g., a tip-out) and the driver demand torque falls toward zero. The engine speed begins to decelerate since little engine torque is demanded by the driver. The intake manifold pressure begins to be reduced as engine cylinders pump air from the engine intake manifold. The DEGR cylinder IVC timing is advanced so that the contents of the intake manifold may be evacuated sooner to avoid the possibility of compressor surge. The contents of the DEGR cylinder are directed upstream of the compressor and a small bit of air may be displaced from the engine air intake. Further, intake and exhaust open time overlap (not shown) may be increased for the DEGR cylinder so that pressurized air blows through the cylinder and is returned to the air intake upstream of the compressor, thereby increasing mass flow through the compressor and reducing the possibility of compressor surge. IVC retard for the DEGR cylinder is increased as intake manifold pressure and engine speed are reduced. IVC retard for the non-dedicated EGR cylinders is increased as engine speed and intake manifold pressure are reduced.

Thus, valve timing of the DEGR cylinder may be adjusted to reduce turbocharger lag and to reduce the possibility of compressor surge. In particular, valve timing and/or lift may be adjusted during a tip-in to reduce EGR flow from the DEGR cylinder, thereby reducing turbocharger lag. On the other hand, valve timing and/or lift may be adjusted during a tip-out to reduce the possibility of compressor surge.

Referring now to FIGS. 5 and 6, a method for operating an engine that includes a DEGR cylinder is shown. The method of FIGS. 5 and 6 may be stored as executable instructions in non-transitory memory of controller 12 shown in FIG. 1.

At 502, method 500 determines engine operating conditions. Engine operating conditions may include but are not limited to engine speed, driver demand torque, ambient air temperature, vehicle speed, intake manifold pressure, and ambient air pressure. Method 500 proceeds to 504 after engine operating conditions are determined.

At 504, method 500 judges if there is a DEGR cylinder bypass valve (e.g., valve 205 of FIG. 2). In one example, a bit or variable in memory may be programmed or set to a value (e.g., 1) that indicates that a DEGR cylinder bypass valve is present. If the bit or variable indicates that the DEGR cylinder bypass valve is present, the answer is yes and method 500 proceeds to 506. Otherwise, the answer is no and method 500 proceeds to 550.

At 550, method 500 judges if a desired torque (e.g., desired engine torque or driver demand torque) is increased from a condition when the engine is at idle conditions. In other examples, method 500 may judge if the desired torque is increased at engine operating conditions where turbocharger lag is experienced (e.g., below a threshold engine speed and engine torque). If desired torque is increased from idle or from a condition where turbocharger lag is experienced, the answer is yes and method 500 proceeds to 552. Otherwise, the answer is no and method 500 proceeds to 560.

At 552, method 500 judges if intake manifold pressure (e.g., in the intake manifold or boost chamber) is greater than (G.T.) a threshold boost pressure. The threshold boost pressure is indicative of the turbocharger lag being overcome. If method 500 judges that intake manifold pressure is greater than a threshold boost pressure, the answer is yes and method 500 proceeds to 556. Otherwise, the answer is no and method 500 proceeds to 554.

At 554, method 500 adjusts valve timing of the DEGR cylinder to decrease external EGR flow to the engine cylinders. In one example where DEGR cylinder IVC is between TDC and BDC compression stroke, IVC is retarded so that cylinder contents may be pushed back into the engine intake manifold, thereby reducing the volumetric efficiency of the DEGR cylinder. In another example, EVC may be retarded to lower the volumetric efficiency of the DEGR cylinder. In still other examples, intake valve opening time and exhaust valve opening time overlap may be increased to lower the cylinder's volumetric efficiency, thereby reducing external EGR. In yet other examples, intake valve lift may be reduced or exhaust valve lift may be reduced to reduce external EGR provided by the DEGR cylinder. In still other examples, IVC may be advanced to before BDC. Additionally, combinations of the mentioned valve timings may be used to reduce external EGR. Method 500 proceeds to exit after valve timing of the DEGR cylinder is adjusted.

Note that valve timing of the non-DEGR cylinders may be different from valve timing of the DEGR cylinder. For example, valve timing of the DEGR cylinder may provide equal flow for the DEGR cylinder and a non-DEGR cylinder during idle, but after a tip-in flow through the DEGR cylinder may be reduced to less than the non-DEGR cylinder. The EGR flow provided by the DEGR cylinder at idle may be determined or limited by engine combustion stability. In other words, external EGR provided by the DEGR cylinder may be increased until engine combustion stability is less than a threshold combustion stability.

At 556, method 500 adjusts flow through the DEGR cylinder (e.g., the external EGR flow rate) to provide a desired flow rate of EGR to the engine cylinders. The desired flow rate of EGR may be empirically determined and stored in a table that is indexed by engine speed and load. In one example, where DEGR cylinder IVC is between TDC and BDC compression stroke, IVC is advanced so that the DEGR cylinder may induct a larger charge, thereby increasing the volumetric efficiency of the DEGR cylinder. In another example, EVC may be advanced to increase the volumetric efficiency of the DEGR cylinder. In still other examples, intake valve opening time and exhaust valve opening time overlap may be reduced to increase the cylinder's volumetric efficiency, thereby increasing external EGR. In yet other examples, intake valve lift may be increased or exhaust valve lift may be increased to increase external EGR provided by the DEGR cylinder. Additionally, combinations of the mentioned valve timings may be used to increase external EGR. Method 500 proceeds to exit after valve timing of the DEGR cylinder is adjusted.

At 560, method 500 judges if a desired torque decrease (e.g., desired engine or driver demand torque) is greater than (G.T.) a threshold. In one example, the desired torque decrease may be determined from accelerator pedal position, and a decreasing accelerator command or position may be referred to as a tip-out. If method 500 judges that desired torque decrease is greater than a threshold, the answer is yes and method 500 proceeds to 562. Otherwise, the answer is no and method 500 proceeds to 564.

At 562, method 500 increases blow through in the DEGR cylinder. By increasing blow through, pressure in the intake manifold may be reduced at a faster rate while mass flow through the compressor is increased, so that the possibility of turbocharger compressor surge may be reduced. In one example, the DEGR cylinder blow through is increased via increasing open intake valve and open exhaust valve overlap. The higher intake manifold pressure induces flow through the cylinder to the engine air intake upstream of the turbocharger compressor. The exhaust gases of the DEGR cylinder are routed upstream of the turbocharger compressor. Method 500 proceeds to exit after valve timing of the DEGR cylinder is adjusted in response to a tip-out.

At 564, method 500 judges if the engine is operating at idle. In one example, the engine may be determined to be operating at idle when engine speed is within a specified speed range and driver demand torque is zero or near zero. If method 500 judges that the engine is operating at idle, the answer is yes and method 500 proceeds to 566. Otherwise, the answer is no and method 500 proceeds to 570.

At 566, method 500 adjusts exhaust flow from the DEGR to provide a desired external EGR flow rate to engine cylinders while the engine is idling. In one example, the desired external EGR flow rate is a flow rate that provides a desired level of combustion stability at idle conditions. In one example, the combustion stability standard deviation of indicated mean effective cylinder pressure (IMEP) is specified as less than 5% from a mean value at idle conditions. The EGR flow rate from the DEGR cylinder may be adjusted via adjusting IVC for the DEGR cylinder. In other examples, intake valve lift of the DEGR cylinder may be adjusted to provide the desired external EGR flow rate. In still other examples, open intake valve and open exhaust valve overlap may be adjusted to provide the desired external EGR flow rate. Method 500 proceeds to 568 after the external EGR flow rate is adjusted via adjusting valve timing of the DEGR cylinder.

At 568, method 500 operates non-DEGR cylinders with IVC timing near BDC intake stroke. For example, if cylinder 1 is on an intake stroke, IVC of cylinder 1 is near BDC intake stroke of cylinder 1. Additionally, in some examples IVC may be retarded from BDC. Similarly, other engine cylinder intake valves are operated with respect to their respective cylinder intake strokes. Thus, the non-DEGR cylinders are operated with IVC timing that may be different from IVC timing of the DEGR cylinder. Method 500 proceeds to exit after engine valve timing is adjusted for engine idle conditions.

At 570, method 500 adjusts valve timing of the DEGR cylinder to vary as desired external EGR flow varies with engine operating conditions. In one example, IVC of the DEGR cylinder is adjusted to vary the external EGR flow rate to match the desired external EGR flow rate. For example, if desired external EGR flow rate increases, IVC of the DEGR cylinder may advance. If desired external EGR flow rate decreases, method 500 retards IVC timing of the DEGR cylinder. IVC for the DEGR cylinder is more advanced at 570 than at 566. In other examples, intake valve lift may be varied with the desired external EGR flow rate. For example, if desired external EGR flow rate increases, intake valve lift of the DEGR cylinder may increase (e.g., the intake valve may open to a further extent). If desired external EGR flow rate decreases, method 500 reduces intake valve lift of the DEGR cylinder. Additionally, at some conditions, EVO timing of the DEGR cylinder may be near BDC exhaust stroke whereas EVO timing for non-DEGR cylinders may advanced from BDC exhaust stroke to increase the amount of energy supplied to the turbocharger turbine. Thus, the DEGR EVO may be retarded from EVO of non-DEGR cylinders.

Valve timing of non-DEGR cylinders is adjusted independent of valve timing for the DEGR cylinder. In one example, IVC of non-DEGR cylinders is varied with engine speed and torque. Method 500 proceeds to exit after valve timing is adjusted.

At 506, method 500 judges if a desired torque (e.g., desired engine torque or driver demand torque) is increased from a condition when the engine is at idle conditions. In other examples, method 500 may judge if the desired torque is increased at engine operating conditions where turbocharger lag is experienced (e.g., below a threshold engine speed and engine torque). If desired torque is increased from idle or from a condition where turbocharger lag is experienced, the answer is yes and method 500 proceeds to 508. Otherwise, the answer is no and method 500 proceeds to 530.

At 508, method 500 judges if intake manifold pressure (e.g., in the intake manifold or boost chamber) is greater than (G.T.) a threshold boost pressure. The threshold boost pressure is indicative of the turbocharger lag being overcome. If method 500 judges that intake manifold pressure is greater than a threshold boost pressure, the answer is yes and method 500 proceeds to 520. Otherwise, the answer is no and method 500 proceeds to 510.

At 510, method 500 opens the DEGR cylinder bypass valve (e.g., 205 of FIG. 2). By opening the DEGR cylinder bypass valve, exhaust gas from the DEGR cylinder is directed to the turbocharger turbine instead of to the engine intake. Consequently, additional energy may be provided to the turbine to reduce the possibility of turbocharger lag. Method 500 proceeds to 512 after the DEGR cylinder bypass valve is opened.

At 512, method 500 adjusts valve timing of the DEGR cylinder to match valve timing of non-DEGR cylinders. For example, if IVC of non-DEGR cylinders is 10 degrees after BDC intake stroke of the respective cylinders, IVC timing of the DEGR cylinder is adjusted to 10 degrees after BDC intake stroke of the DEGR cylinder. Likewise, exhaust valve timing and open intake valve and open exhaust valve overlap of the DEGR cylinder is adjusted to the same timings as the non-DEGR cylinders. Method 500 proceeds to exit after DEGR valve timing is adjusted.

At 520, method 500 closes the DEGR cylinder bypass valve (e.g., 205 of FIG. 2). By closing the DEGR cylinder bypass valve, exhaust gas from the DEGR cylinder is directed to engine cylinders via the engine intake. Consequently, external EGR may be provided to the engine cylinders. Method 500 proceeds to 522 after the DEGR cylinder bypass valve is opened.

At 522, method 500 adjusts flow through the DEGR cylinder (e.g., the external EGR flow rate) to provide a desired flow rate of EGR to the engine cylinders. The desired flow rate of EGR may be empirically determined and stored in a table that is indexed by engine speed and load. In one example, where DEGR cylinder IVC is between TDC and BDC compression stroke, IVC is advanced to increase the EGR flow rate so that the DEGR cylinder may induct a larger charge, thereby increasing the volumetric efficiency of the DEGR cylinder. In another example, EVC may be advanced to increase the EGR flow rate and volumetric efficiency of the DEGR cylinder. In still other examples, intake valve opening time and exhaust valve opening time overlap may be reduced to increase the DEGR cylinder's volumetric efficiency, thereby increasing external EGR. In yet other examples, intake valve lift may be increased or exhaust valve lift may be increased to increase external EGR provided by the DEGR cylinder. Similarly, the reverse actions may be taken to reduce the EGR flow rate. Additionally, combinations of the mentioned valve timings may be used to increase external EGR to the non-DEGR cylinders. Method 500 proceeds to exit after valve timing of the DEGR cylinder is adjusted.

At 530, method 500 judges if a desired torque decrease (e.g., desired engine or driver demand torque) is greater than (G.T.) a threshold. In one example, the desired torque decrease may be determined from accelerator pedal position, and a decreasing accelerator command or position may be referred to as a tip-out. If method 500 judges that desired torque decrease is greater than a threshold, the answer is yes and method 500 proceeds to 532. Otherwise, the answer is no and method 500 proceeds to 534.

At 532, method 500 opens the DEGR cylinder bypass valve (e.g., 205 of FIG. 2) and reduces external EGR flow to the engine cylinders while increasing exhaust flow to the exhaust manifold 48. By decreasing flow of external EGR to engine cylinders, it may be possible to improve combustion stability during operating conditions where there may be less tolerance for higher levels of dilution. Method 500 proceeds to exit after the DEGR cylinder bypass valve is at least partially opened in response to a tip-out.

At 534, method 500 judges if the engine is operating at idle. In one example, the engine may be determined to be operating at idle when engine speed is within a specified speed range and driver demand torque is zero or near zero. If method 500 judges that the engine is operating at idle, the answer is yes and method 500 proceeds to 536. Otherwise, the answer is no and method 500 proceeds to 540.

At 536, method 500 adjusts exhaust flow from the DEGR to provide a desired external EGR flow rate to engine cylinders while the engine is idling. In one example, the desired external EGR flow rate is a flow rate that provides a desired level of combustion stability at idle conditions. In one example, the combustion stability standard deviation of indicated mean effective cylinder pressure (IMEP) is specified as less than 5% from a mean value at idle conditions. The EGR flow rate from the DEGR cylinder to engine cylinders may be adjusted via adjusting IVC for the DEGR cylinder. In other examples, intake valve lift of the DEGR cylinder may be adjusted to provide the desired external EGR flow rate. In still other examples, open intake valve and open exhaust valve overlap may be adjusted to provide the desired external EGR flow rate. Method 500 proceeds to 538 after the external EGR flow rate is adjusted via adjusting valve timing of the DEGR cylinder.

At 538, method 500 operates non-DEGR cylinders with IVC timing near BDC intake stroke. For example, if cylinder 1 is on an intake stroke, IVC of cylinder 1 is near BDC intake stroke of cylinder 1. Additionally, in some examples IVC may be retarded from BDC. Similarly, other engine cylinder intake valves are operated with respect to their respective cylinder intake strokes. Thus, the non-DEGR cylinders are operated with IVC timing that may be different from IVC timing of the DEGR cylinder. Method 500 proceeds to exit after engine valve timing is adjusted for engine idle conditions.

At 540, method 500 adjusts valve timing of the DEGR cylinder to vary as desired external EGR flow varies with engine operating conditions. In one example, IVC of the DEGR cylinder is adjusted to vary the external EGR flow rate to match the desired external EGR flow rate. For example, if desired external EGR flow rate increases, IVC of the DEGR cylinder may advance. If desired external EGR flow rate decreases, method 500 retards IVC timing of the DEGR cylinder. IVC for the DEGR cylinder is more advanced at 540 than at 536. In other examples, intake valve lift may be varied with the desired external EGR flow rate. For example, if desired external EGR flow rate increases, intake valve lift of the DEGR cylinder may increase (e.g., the intake valve may open to a further extent). If desired external EGR flow rate decreases, method 500 reduces intake valve lift of the DEGR cylinder. Additionally, at some conditions EVO timing of the DEGR cylinder may be near BDC exhaust stroke whereas EVO timing for non-DEGR cylinders may be advanced from BDC exhaust stroke to increase the amount of energy supplied to the turbocharger turbine. Thus, the DEGR EVO may be retarded from EVO of non-DEGR cylinders.

Valve timing of non-DEGR cylinders is adjusted independent of valve timing for the DEGR cylinder. In one example, IVC of non-DEGR cylinders is varied with engine speed and torque. Method 500 proceeds to exit after valve timing is adjusted.

Thus, the method of FIGS. 5 and 6 provides for an engine operating method, comprising: reducing exhaust flow of one or more dedicated EGR cylinders providing external exhaust gas recirculation to cylinders of an engine in response to an increase in driver demand torque. The method includes where reducing exhaust flow of the one or more dedicated EGR cylinders providing external exhaust gas recirculation to cylinders of the engine includes retarding intake valve closing time from bottom dead center intake stroke of the dedicated EGR cylinders. The method further comprises increasing blow through of the dedicated EGR cylinders providing external exhaust gas recirculation to cylinders of the engine.

In one example, the method includes where blow through is increased via increasing intake valve opening and exhaust valve opening time overlap. The method further comprises increasing exhaust flow of the one or more dedicated EGR cylinders providing external exhaust gas recirculation to cylinders of the engine in response to boost pressure reaching a threshold pressure. The method further comprises adjusting valve timing of the one or more dedicated EGR cylinders providing external exhaust gas recirculation to cylinders of the engine to improve volumetric efficiency of the dedicated EGR cylinders in response to a decrease in driver demand torque.

In another example, the method of FIGS. 5 and 6 provides for a method for an engine, comprising: externally recirculating exhaust gas from one or more dedicated EGR cylinders of a multi-cylinder engine to an engine intake; and during engine idle, operating the one or more dedicated EGR cylinders with variable valve timing at a first timing/position relative to a crankshaft; and in response to a tip-in from engine idle, transitioning variable valve timing of the one or more dedicated EGR cylinders to a second timing/position relative to the crankshaft to reduce turbocharger lag. The method includes where valve timing of cylinders of the engine other than the one or more dedicated EGR cylinders are adjusted to different timings relative to the crankshaft.

The method also includes where the second timing/position reduces flow through the one or more dedicated EGR cylinders relative to the first timing/position. The method further comprises adjusting exhaust flow of the one or more dedicated EGR cylinders in response to boost pressure reaching a threshold pressure. The method includes where exhaust gas from the one or more dedicated EGR cylinders is routed to a location upstream of a turbocharger compressor and where exhaust gas of other engine cylinders is not routed to the location upstream of the turbocharger compressor. The method further comprises increasing volumetric efficiency of the one or more dedicated EGR cylinders in response to a decrease in driver demand torque until a threshold intake manifold pressure is reached. The method further comprises opening a bypass valve of the one or more dedicated EGR cylinders in response to the tip-in. The method further comprises closing the bypass valve of the one or more dedicated EGR cylinders in response to engine boost pressure being greater than a threshold pressure.

As will be appreciated by one of ordinary skill in the art, method described in FIGS. 5 and 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
reducing exhaust flow of one or more dedicated EGR cylinders providing external exhaust gas recirculation to cylinders of an engine in response to an increase in driver demand torque, and
increasing exhaust flow of the one or more dedicated EGR cylinders providing external exhaust gas recirculation to cylinders of the engine in response to boost pressure reaching a threshold pressure.

2. The method of claim 1, where reducing exhaust flow of the one or more dedicated EGR cylinders providing external exhaust gas recirculation to cylinders of the engine includes retarding intake valve closing time from bottom dead center intake stroke of the one or more dedicated EGR cylinders providing external exhaust gas recirculation to cylinders of the engine.

3. The method of claim 1, further comprising increasing blow through of the one or more dedicated EGR cylinders providing external exhaust gas recirculation to cylinders of the engine.

4. The method of claim 3, where blow through is increased via increasing intake valve opening and exhaust valve opening time overlap.

5. The method of claim 1, further comprising adjusting valve timing of the one or more dedicated EGR cylinders providing external exhaust gas recirculation to cylinders of the engine to increase blow through of the one or more dedicated EGR cylinders providing external exhaust gas recirculation to cylinders of the engine in response to a decrease in driver demand torque.

6. A method for an engine, comprising:
externally recirculating exhaust gas from one or more dedicated EGR cylinders of a multi-cylinder engine to an engine intake; and
during engine idle, operating the one or more dedicated EGR cylinders with variable valve timing at a first timing/position relative to a crankshaft; and
in response to a tip-in from engine idle, transitioning variable valve timing of the one or more dedicated EGR cylinders to a second timing/position relative to the crankshaft to reduce turbocharger lag.

7. The method of claim 6, where valve timing of cylinders of the engine other than the one or more dedicated EGR cylinders is adjusted to different timings relative to the crankshaft.

8. The method of claim 6, where the second timing/position reduces flow through the one or more dedicated EGR cylinders relative to the first timing/position.

9. The method of claim 6, further comprising adjusting exhaust flow of the one or more dedicated EGR cylinders in response to boost pressure reaching a threshold pressure.

10. The method of claim 9, where exhaust gas from the one or more dedicated EGR cylinders is routed to a location upstream of a turbocharger compressor and where exhaust gas of other engine cylinders is not routed to the location upstream of the turbocharger compressor.

11. The method of claim 6, further comprising increasing blow through of the one or more dedicated EGR cylinders in response to a decrease in driver demand torque.

12. The method of claim 6, further comprising opening a bypass valve of the one or more dedicated EGR cylinders in response to the tip-in.

13. The method of claim 12, further comprising closing the bypass valve of the one or more dedicated EGR cylinders in response to engine boost pressure being greater than a threshold pressure.

14. A vehicle system, comprising:
an engine;
a first variable valve adjustment device coupled to the engine and operating valves of a first cylinder;
a second variable valve adjustment device coupled to the engine and operating valves of a second cylinder;

a passage fluidly coupling an exhaust side of the first cylinder to an air intake of the engine, the passage not fluidly coupling an exhaust side of other engine cylinders to the air intake; and a controller including non-transitory instructions for:
increasing blow through of the first cylinder in response to an accelerator tip-out,
decreasing volumetric efficiency of the first cylinder in response to an accelerator tip-in, and
increasing volumetric efficiency of the first cylinder during the tip-in in response to a boost pressure.

15. The vehicle system of claim 14, further comprising additional instructions for operating valves of the first cylinder at a different timing than valves of the second cylinder during an engine cycle.

16. The vehicle system of claim 14, further comprising additional instructions for decreasing volumetric efficiency of the first cylinder during a tip-in from an engine idle condition.

17. An engine operating method, comprising:
reducing exhaust flow of one or more dedicated EGR cylinders providing external exhaust gas recirculation to cylinders of an engine in response to an increase in driver demand torque; and
increasing blow through of the one or more dedicated EGR cylinders providing external exhaust gas recirculation to cylinders of the engine, where blow through is increased via increasing intake valve opening and exhaust valve opening time overlap.

18. The vehicle system of claim 14, further comprising a bypass valve for the first cylinder and further instructions for opening the bypass valve in response to a tip-in.

* * * * *